(12) United States Patent
Criado Del Pino et al.

(10) Patent No.: US 11,753,091 B2
(45) Date of Patent: Sep. 12, 2023

(54) FIXING FOR A SPARE WHEEL

(71) Applicant: ILLINOIS TOOL WORKS INC., Glenview, IL (US)

(72) Inventors: Francisco Criado Del Pino, Cerdanyola del Valles (ES); Francisco Cuervas Florido, Rubi (ES); Ivan Cipres Ballester, Braunschweig (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 96 days.

(21) Appl. No.: 17/333,849

(22) Filed: May 28, 2021

(65) Prior Publication Data

US 2021/0371019 A1 Dec. 2, 2021

(30) Foreign Application Priority Data

Jun. 2, 2020 (EP) ..................................... 20177856
Jun. 17, 2020 (EP) ..................................... 20180473
May 5, 2021 (EP) ..................................... 21172268

(51) Int. Cl.
 B62D 43/02 (2006.01)
(52) U.S. Cl.
 CPC .................................... B62D 43/02 (2013.01)
(58) Field of Classification Search
 CPC ........... B62D 43/02; F16B 21/02; F16B 21/04
 USPC .............. 411/349, 549, 552, 553; 224/42.12, 224/42.21, 42.24
 See application file for complete search history.

(56) References Cited

U.S. PATENT DOCUMENTS

| | | | | |
|---|---|---|---|---|
| 2,378,122 A | * | 6/1945 | Barlow | ..................... F16B 5/10 411/552 |
| 5,779,422 A | * | 7/1998 | Petignat | .................. F16B 39/28 411/553 |
| 6,267,543 B1 | * | 7/2001 | David | ..................... F16B 21/02 411/549 |
| 6,338,649 B1 | * | 1/2002 | Smith | .................. H01R 11/282 439/504 |
| 7,073,995 B2 | | 7/2006 | Herb | |
| 7,874,779 B2 | * | 1/2011 | Csik | ..................... F16B 5/0208 411/553 |
| 8,430,615 B2 | * | 4/2013 | Chen | ..................... F16B 5/0208 411/107 |
| 8,567,733 B2 | * | 10/2013 | Wang | ..................... F16D 1/112 248/220.21 |
| 9,309,833 B2 | * | 4/2016 | Senofonte | ................. F23R 3/60 |
| 2003/0156923 A1 | * | 8/2003 | Winkler | .................. F16B 7/105 411/552 |

(Continued)

FOREIGN PATENT DOCUMENTS

| CN | 106218738 B | 3/2019 |
|---|---|---|
| JP | S5881869 A | 5/1983 |

(Continued)

*Primary Examiner* — Scott T McNurlen
(74) *Attorney, Agent, or Firm* — THOMPSON HINE LLP

(57) ABSTRACT

A fixing is provided for securing a spare wheel to a structure, for example a part of a vehicle, the fixing including a connector having a lug arranged such that rotation of the fixing relative to the structure moves the lug into a recess of the structure to secure the fixing to the structure; and wherein the connector further includes a resilient articulated arm arranged to act between the fixing and the structure to urge the lug into the recess when the fixing is connected to the structure.

9 Claims, 7 Drawing Sheets

(56) References Cited

U.S. PATENT DOCUMENTS

2020/0132101 A1* 4/2020 Zander .................. F16B 21/084

FOREIGN PATENT DOCUMENTS

| KR | 20050006792 | | 1/2005 |
| KR | 20060079666 A | * | 7/2006 |

* cited by examiner

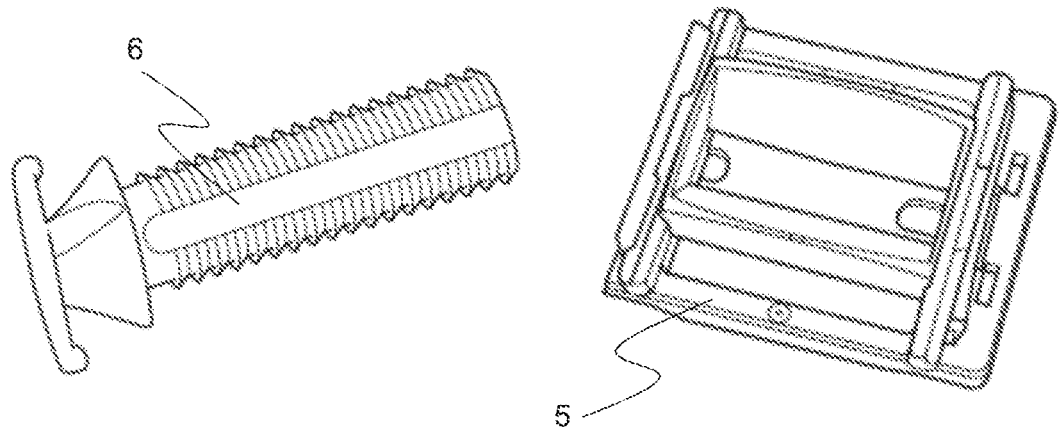
FIG. 2A
(Prior Art)
FIG. 2B
(Prior Art)
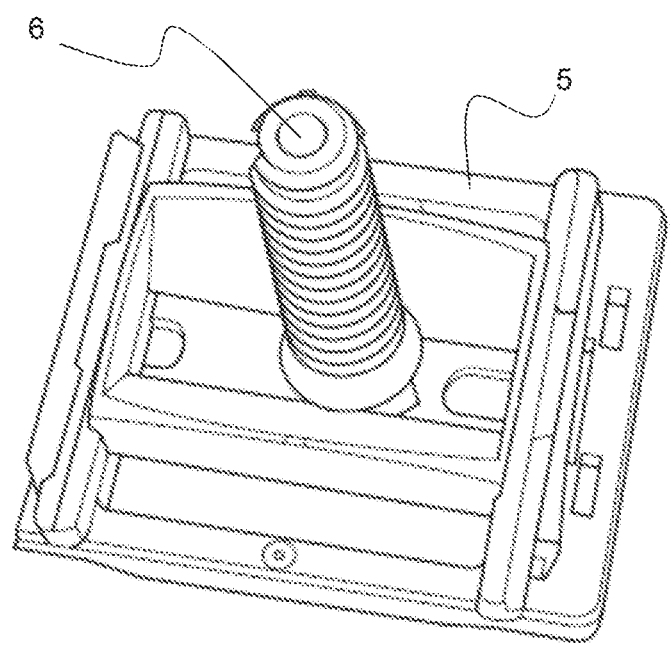
FIG. 2C
(Prior Art)

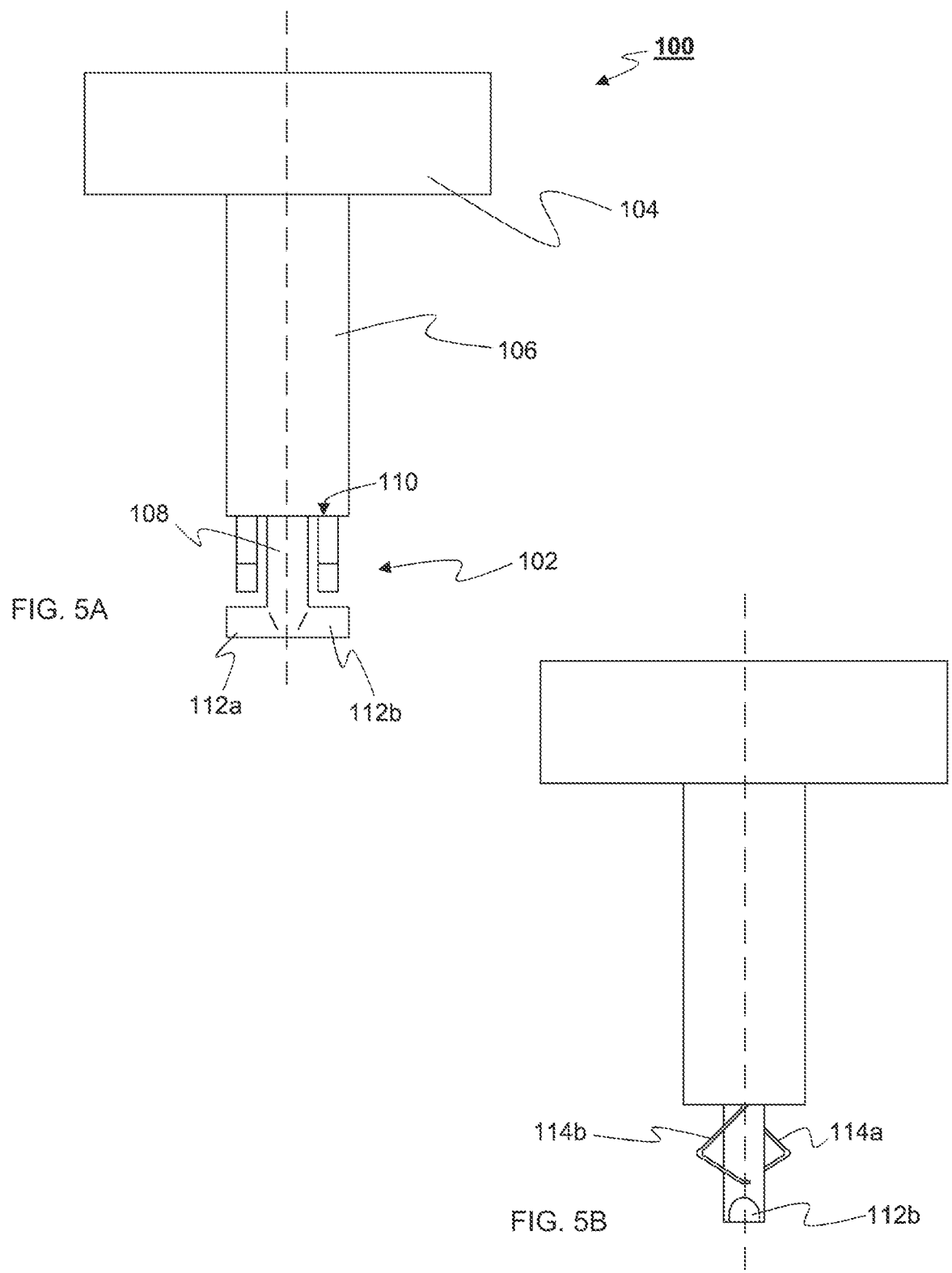

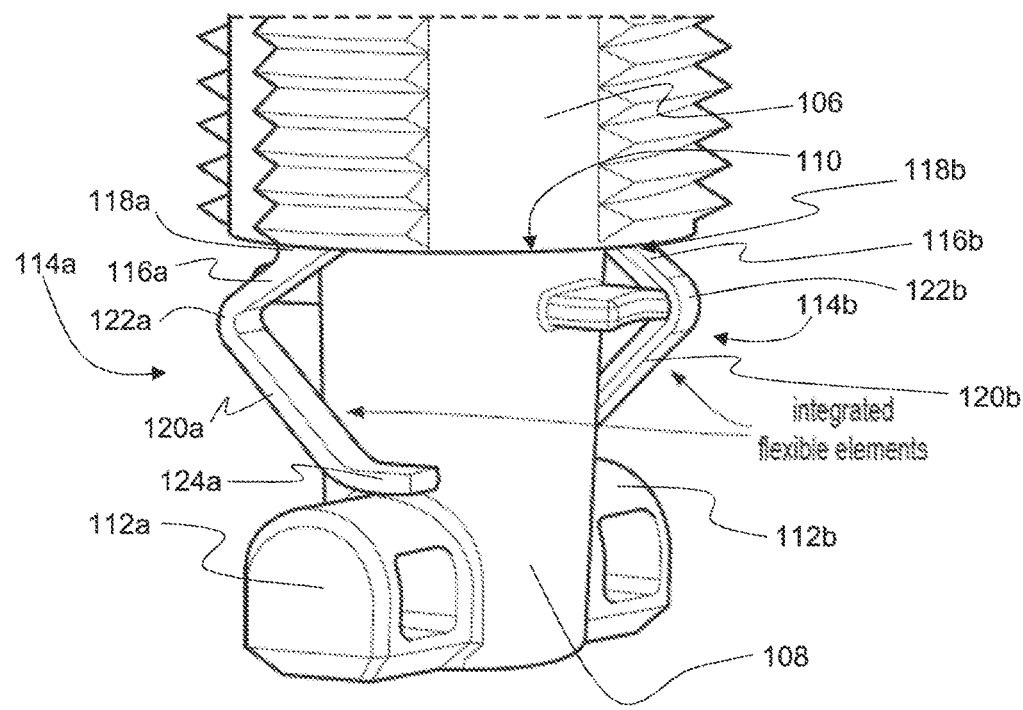
FIG. 6A
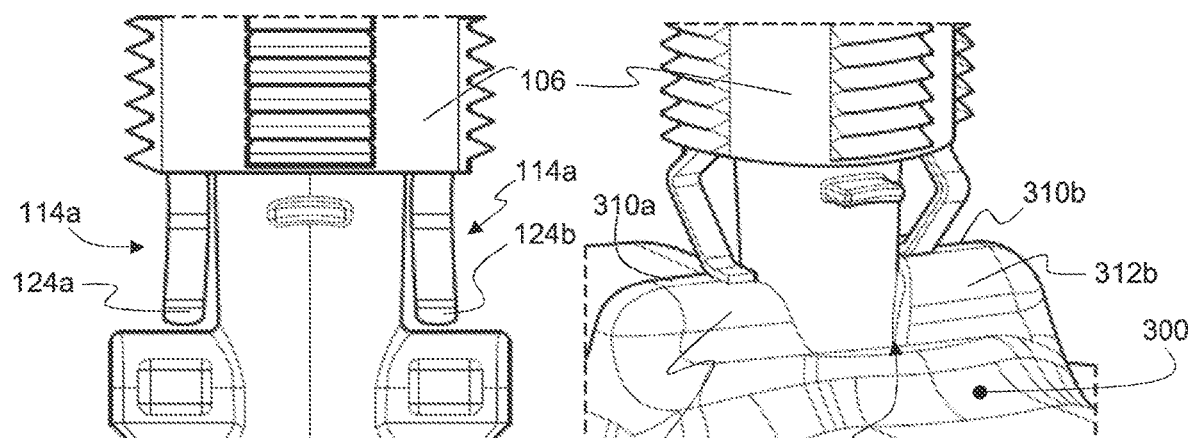
FIG. 6B
FIG. 6C

FIXING FOR A SPARE WHEEL

TECHNICAL FIELD OF INVENTION

The invention relates to a fixing for securing a spare wheel to a structure, for example a part of a vehicle.

BACKGROUND

In vehicles such as cars a spare wheel is commonly carried in the boot (trunk). A fixing, for example a bolt, is used to hold the spare wheel in place. The fixing usually connects to a corresponding fixing feature on the vehicle, for example a threaded hole formed in a plate on the floor of the car boot. In particular, conventional fixings currently on the market usually require a welded nut 1, 2 in the car body and a metallic screw 3, 4, as shown in FIGS. 1A-1D. Another solution is shown in FIGS. 2A-2C, where an additional plastic holder 5 is utilised to secure a plastic screw 6. Further, the fixing shown in FIGS. 3A-3B requires a plastic screw 7 that is releasably coupled to a specific metal bracket 8 to then couplingly engage with a corresponding counterpart securing the wheel.

However, all of these known solutions require multiple components to provide a suitable tension between the fixing assembly and the spare wheel.

Consequently, it is an object of the present invention to provide an improved fixing having less components, minimising manufacturing costs and improving ease of use during installation or removal of the wheel.

SUMMARY

According to the present invention, there is provided a fixing for securing a spare wheel to a structure, for example a part of a vehicle, the fixing comprising a connector having a lug configured such that rotation of the fixing relative to the structure moves the lug into a recess of the structure to secure the fixing to the structure; and wherein the connector further comprises a resilient articulated arm arranged to act between the fixing and the structure to urge the lug into the recess when the fixing is connected to the structure.

The resilient articulated arm acts as a biasing member between the structure and the fixing to hold the lug in the recess. The resilient articulated arms provide a biasing force that urges the fixing away from the structure during use, so that the fixing may be connected to the structure by a push-and-turn action that moves the lug into the recess.

During use, for example in a vehicle, the resilient articulated arms may advantageously prevent the lug moving out of the recess due to movements and vibrations generated by the vehicle.

In addition, the resilient articulated arm can be integrally moulded as a part of the fixing, which is beneficial for manufacture as no assembly of a separate biasing member (e.g. spring or elastic ring) is required. Also, the resilient articulated arm is preferable to an elastic ring or coil spring because the articulation allows the resilient articulated arm to more easily slide across the surface of the structure as the fixing is rotated to connect it to the structure.

The fixing may further comprise a shaft with the connector disposed at one end of the shaft. Additionally, the fixing may comprise a cap at an opposite end of the shaft to the connector. The cap is arranged to retain the spare wheel during use. In particular, during use the shaft extends through the spare wheel (e.g. through a hole or opening in the spare wheel) and the connector connects to the structure. In this position the cap retains the spare wheel in place. The cap may be integral with the shaft, or the cap may be removably connected to the shaft, for example by a thread. Preferably, the cap and the shaft are connected by a partial thread.

In preferred examples, the structure is a part of a vehicle, for example a car. The structure may be a part of a boot (i.e. trunk) of a car, or another part of the car where the spare wheel will be stored. The structure may be a part of the chassis of the vehicle, or it may be attached to the chassis (e.g. using a fixing or by joining). In one example, the structure comprises a mounting plate.

Preferably, the structure comprises an opening through which the fixing extends during use, and an underside of the structure comprises the recess. To connect the fixing to the structure the connector is passed through the opening in the structure in a first rotational position. The opening is shaped to permit the connector to pass through in the first rotational position. Then the fixing is rotated to a second rotational position in which the lug is disposed in the recess. In the second rotational position the lug and recess connect the fixing to the structure. Accordingly, the fixing is connected to the structure by a push-and-turn action. Preferably, the first and second rotational positions are separated by 90 degrees of rotation, but they may alternatively be separated by other amounts of rotation, for example, 45 degrees of rotation, 60 degrees or rotation, or 18-degrees of rotation, among other examples.

Preferably, the shaft comprises a shoulder, and the resilient articulated arm may extend from the shoulder in an axial direction of the shaft. In this position, the resilient articulated arm engages the structure, in particular a side of the structure facing the spare wheel.

The resilient articulated arm preferably comprises a first articulation at the join between the resilient articulated arm and the shoulder. The first articulation is preferably resiliently bendable. Preferably, an end of the resilient articulated arm opposite to the first articulation is a free end.

In preferred examples, the resilient articulated arm further comprises a second articulation disposed between the first articulation and the free end. The second articulation may bend in an opposite direction to the first articulation. Therefore, the resilient articulated arm may fold as the first and second articulations bend.

In preferred examples, the fixing comprises a plurality of lugs, for example two, three or four lugs, and the structure has a corresponding plurality of recesses.

In preferred examples, the fixing comprises a plurality of resilient articulated arms, for example two, three, or four resilient articulated arms. A plurality of resilient articulated arms may ensure that the fixing is pushed evenly so as to maintain its orientation relative to the structure (e.g. perpendicular to the structure).

In examples where the fixing comprises a plurality of resilient articulated arms, each resilient articulated arm may have an angled portion that engages the structure (e.g. the portion between the second articulation and the free end as described above). In such examples, the resilient articulated arms may be arranged so that the angled portions are acutely angled to the structure in the direction of rotation of the fixing to connect the fixing to the structure (or vice versa). In this way, the angled portions facilitate sliding of the resilient articulated arms over the structure as the fixing is rotated. Additionally, if the angled portions are acutely angled to the structure in the direction of rotation of the fixing to connect the fixing to the structure, then the resilient articulated arms may oppose counterrotation (i.e., rotation to remove the fixing from the structure) because the resilient articulated arms may jam under such counterrotation.

In some examples, to connect the fixing to the structure the user pushes the fixing towards the structure to deform the or each resilient articulated arm, and then rotate the fixing so that the lug moves into the recess. In such an example the surface of the structure that faces the spare wheel may be planar (i.e., flat).

In some examples, a surface of the structure that is engaged by the or each resilient articulated arm (i.e., the surface of the structure that faces the spare wheel) may be contoured to define one or more sloped sections over which the or each resilient articulated arm may be slid during rotation of the fixing. In one example, the structure comprises, for the or each resilient articulated arm, a sloped section leading to a raised section. When connecting the fixing to the structure the or each resilient articulated arm will slide up the or each sloped section to the or each raised section. The or each raised section ensures that the or each resilient articulated arm is in a partially bent state when the fixing is connected to the structure, ensuring that a biasing force is generated to hold the or each lug in the or each recess.

Preferably, the or each resilient articulated arm is an integrally moulded part of the fixing. Preferably, at least the shaft, connector, and the or each resilient articulated arm are integrally moulded. In some examples, the fixing further comprises a cap, and the cap may additionally be integrally moulded with the other features of the fixing.

Integrally moulding the resilient articulated arms, in particular, removes the need for a separate assembly step of a resilient member (e.g., an elastic ring or coil spring).

According to a further aspect of the present invention, there is also provided a fixing system for securing a spare wheel to a vehicle. The fixing system comprises a structure, for example a part of a vehicle. The structure comprises a recess. The fixing system also comprises the fixing described above. As described above, the connection portion of the fixing is configured to engage the recess of the structure to connect the fixing to the structure.

BRIEF DESCRIPTION OF DRAWINGS

Example embodiment(s) of the invention are illustrated in the accompanying drawings, in which:

FIGS. 2A-2C (Prior Art) illustrate another known fixation system including (FIG. 1A) a plastic thread element that is coupleable to (FIG. 1B), (FIG. 1C) a bracket or holder fixed to the vehicle structure;

FIGS. 5A-5B illustrate the fixing of FIG. 4 in (FIG. 4A) a front view and (FIG. 4B) a side view;

FIGS. 6A-6C illustrate close-up views of the fixing of FIGS. 5A and 5B in (FIG. 6A) a perspective side view, (FIG. 6B) a front view and (FIG. 6C) a perspective top-side view when coupled to the vehicle structure.

DESCRIPTION

Figure 1A:
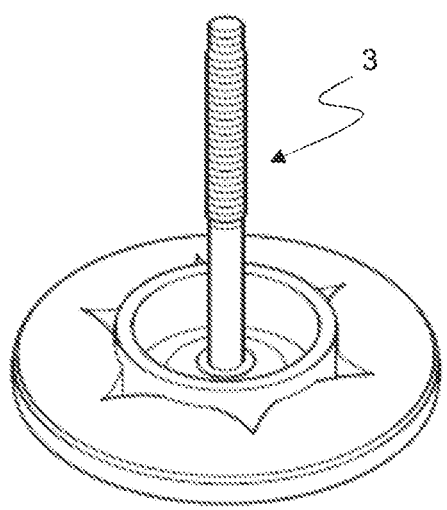
FIGS. 1A-1D (Prior Art) illustrate different designs of a known fixation system using a vehicle fixed thread member (FIG. 1B), (FIG. 1D) cooperating with a respective threaded wheel engagement member (FIG. 1A), (FIG. 1C)
Figure 1B:
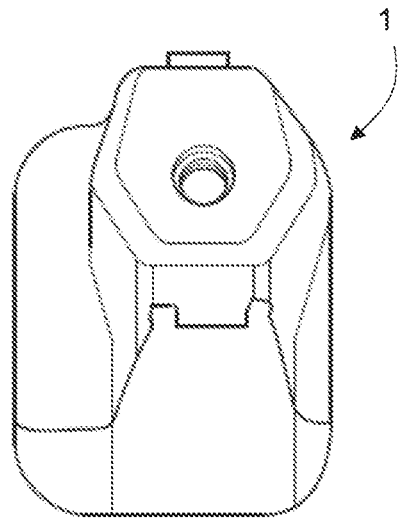
Figure 1C:
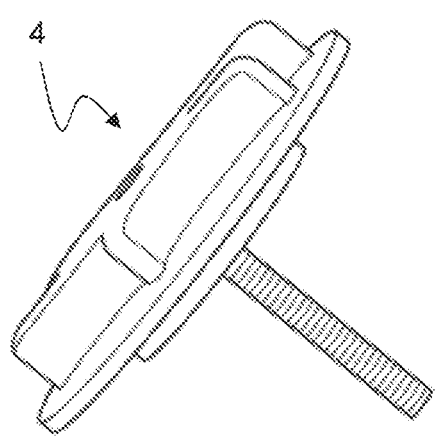
Figure 1D:
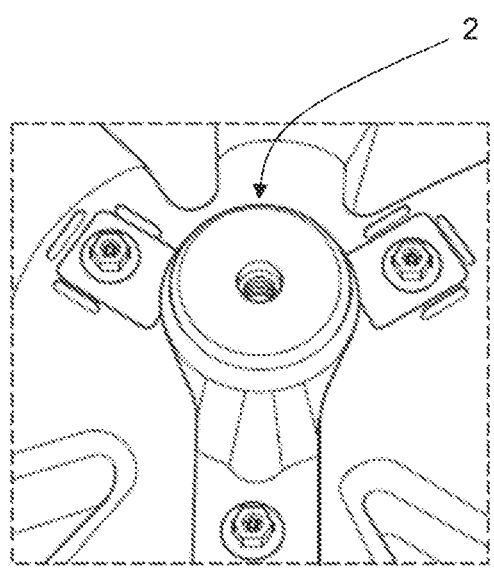
Figure 3A:
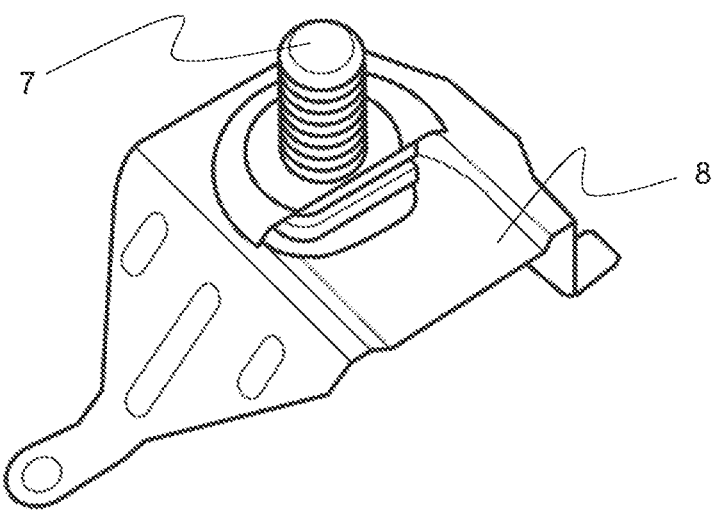
FIGS. 3A-3B (Prior Art) illustrate another known fixation system where (FIG. 3A) a threaded member is coupled to a (metal) bracket that is (FIG. 3B) permanently installed to a vehicle structure (covered up)
Figure 3B:
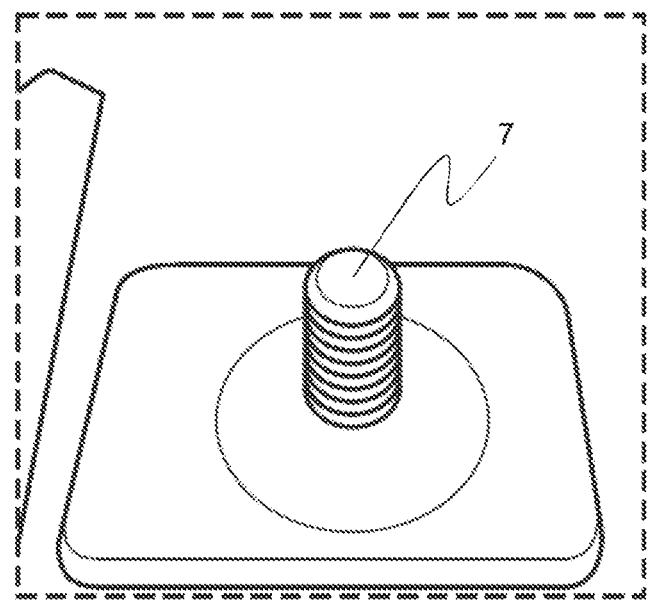

The described example embodiment relates to a fastener or fixing for a vehicle, and particularly, a fixing for a spare wheel for a vehicle structure. However, the invention is not limited for use with vehicle components but may be used for any suitable fastening purposes.

Certain terminology is used in the following description for convenience only and is not limiting. The words 'right', 'left', 'lower', 'upper', 'front', 'rear', 'upward', 'down', 'downward', 'above' and 'below' designate directions in the drawings to which reference is made and are with respect to the described component when assembled and mounted (e.g. in situ). The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Through the description and claims of this specification, the terms 'comprise' and 'contain', and variations thereof, are interpreted to mean 'including but not limited to', and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality, as well as, singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract or drawings), or to any novel one, or any novel combination, of the steps of any method or process so disclosed.

Figure 4:
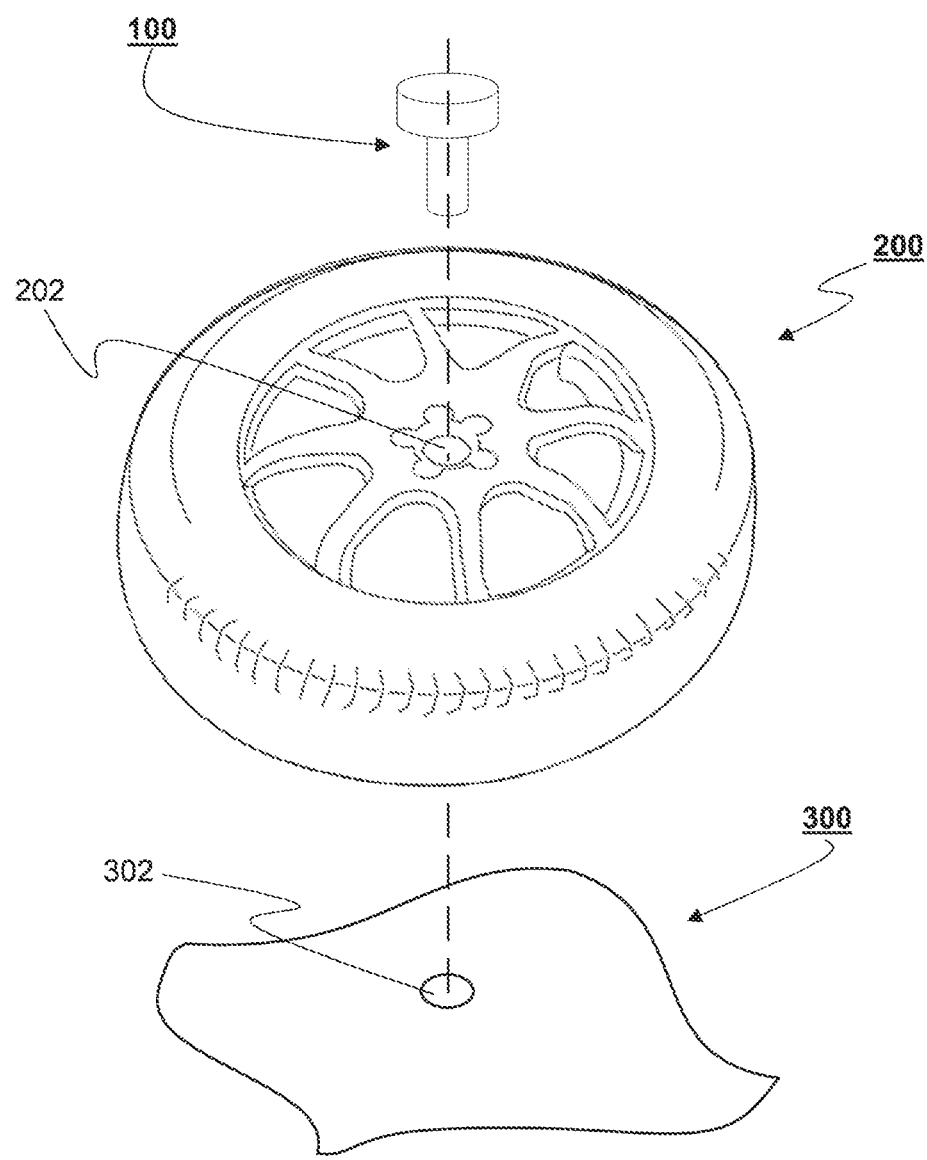
FIG. 4 illustrates an exploded perspective view of a vehicle spare wheel being secured to a part of the vehicle by a fixing of the present invention.

Referring to FIG. 4, a fixing 100 is used to secure a spare wheel 200 to a structure 300 of a vehicle, for example a car.

Typically, the structure 300 is located in the boot (i.e. trunk) of a vehicle, such as a car. The structure 300 may be a part of the floor of the vehicle boot, or it may be an additional plate attached (e.g. fastened or joined) onto the floor of the vehicle boot or other structural member of the vehicle.

The fixing 100 is extended through a central bore 202 of the spare wheel 200 but may alternatively extend through a different opening in the spare wheel 200, for example a lug hole or any other suitable opening.

As described further hereinafter, the fixing 100 includes a connector portion 102 (see FIG. 5A) for connecting to a corresponding connection feature 302 of the structure 300. When connected to the structure 300, a cap member 104 of the fixing 100 is configured to retainingly secure the spare wheel 200 to the structure 300.

FIGS. 5A and 5B show simplified front and side view illustrations of the fixing 100 comprising a cap member 104, a shaft 106, and the connector portion 102. The shaft 106 extends between the cap member 104 and the connector portion 102.

The cap member 104 may be shaped so as to be held and/or gripped by a user. For example, the cap member 104 may have grooves or other formations (not shown) that facilitate a user gripping the cap member 104. The cap member 104 may be sized so as to operably clamp onto the spare wheel 200 (i.e. it is larger than the opening 202 in the spare wheel 200 as shown in FIG. 4). The cap member 104 may further be shaped so as to match a recess or other geometry of the spare wheel 200, i.e. to sit flush within the spare wheel 200.

Referring now to FIGS. 6A-6C, the shaft 106 may be threaded, and the cap member 104 may be removably coupleable to the shaft 106, for example, via an internally threaded hole configured for attachment to the shaft 106. In this particular example embodiment, the thread on the shaft 106 is provided by partial thread sections, each one circumferentially extending only about a portion of the shaft 106. The cap member 104 may have corresponding partial internal thread sections. In this way, the cap member 104 can be secured to the shaft 106 through a rotation of less than 90 degrees, typically about 45 degrees.

In alternative examples, the cap member 104 and shaft 106 may be integrally formed, i.e. the thread or thread sections are not required.

As shown particularly in FIGS. 4 and 6A-6C, the connector portion 102 is configured to be removably connected to the structure 300, and in particular, to a corresponding connection feature 302 formed within the structure 300.

In particular, the connector portion 102 has a spigot 108 axially extending away from a distal end of the shaft 106. Here, the spigot 108 has a smaller diameter than the shaft 106, so as to form a shoulder 110 between the shaft 106 and the spigot 110. Two lugs 112a, 112b extend transversely away from the spigot 108 (i.e. radially away from a longitudinal axis of the coaxial shaft 106 and spigot 108). The lugs 112a, 112b extend in opposite directions from one another, so as to form a T-bar.

Figure 7:
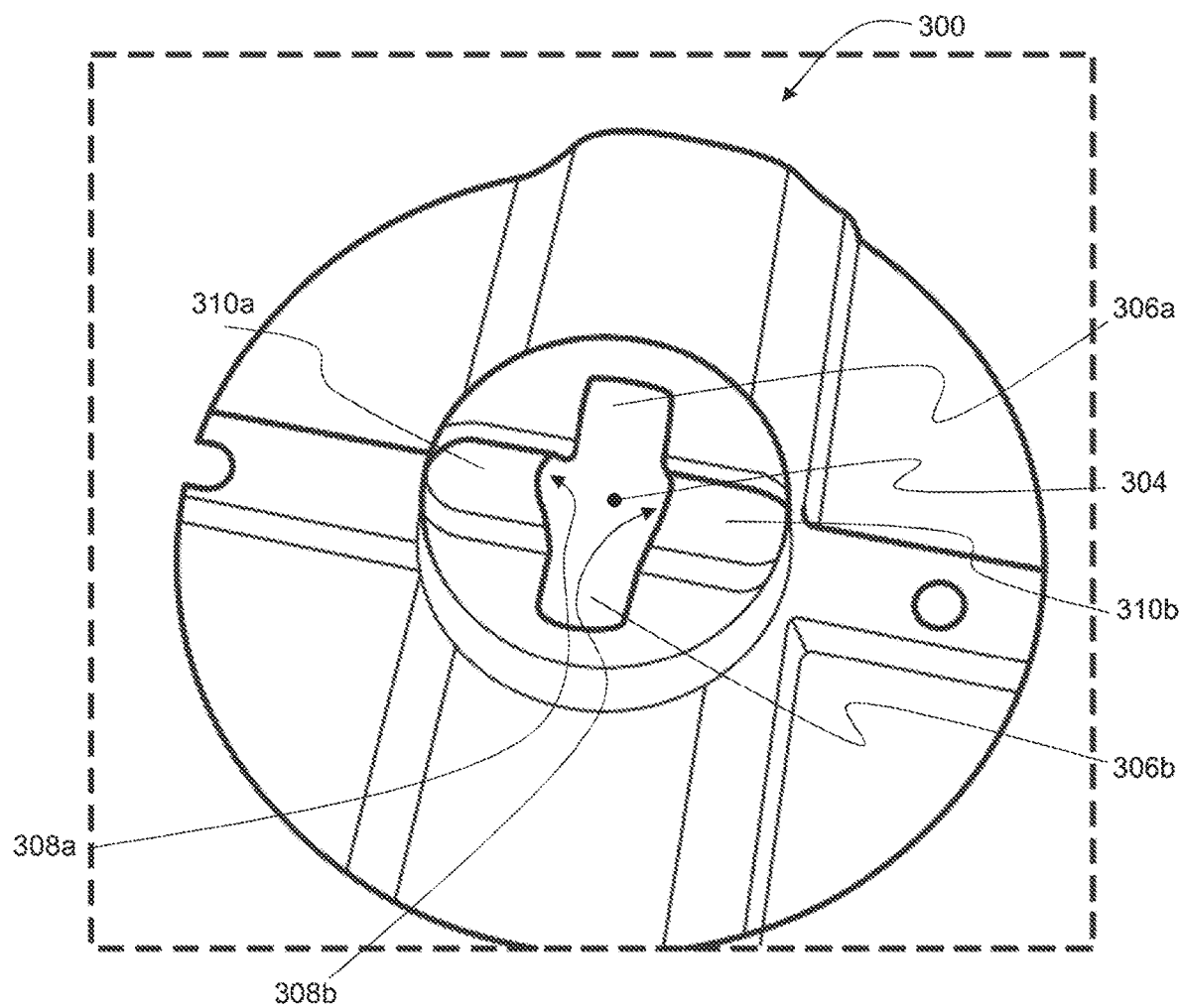
FIG. 7 illustrates a top view of the fastening plate coupled to the vehicle structure and suitable for couplingly receive the connector portion of the fixing.

In the illustrated examples, shown particularly in FIG. 6C and FIG. 7, the structure 300, or at least a portion of the structure 300 in proximity to the connection feature 302, is a planar structure or plate-like, for example having a thickness of between 0.5 mm and 5 mm. The connection feature 302 in the structure 300 may have a central opening 304 and two side openings 306a, 306b extending laterally from the central opening 304 forming an elongate opening within the structure 300. The openings 304, 306a, 306b are configured to permit the spigot 108 and laterally extending lugs 112a and 112b to pass through to the underside of the structure 300.

With reference to FIG. 7 in particular, the underside of the structure 300 may comprise recesses 308a, 308b that are formed in an orientation perpendicular to the orientation of the side openings 306a and 306b and extending towards the central opening 304. The recesses 308a and 308b are configured to retainingly receive at least a portion of the lugs 112a and 112b, i.e. the recess profile may substantially match the profile of the lugs 112a, 112b.

Further, in this particular example, the recesses 308a, 308b are formed by contours within the structure 300, i.e. the structure 300 comprises a bend in the plate material to define the recesses 308a, 308b on the underside of the structure 300 (i.e., opposite to the side where the spare wheel 200 is placed). These folds also define raised areas 310a, 310b on the side of the structure 300 facing the spare wheel 200, which will be referred to hereinafter.

During use, in order to connect the connector portion 102 to the structure 300, the connector portion 102 is pushed through the connection feature 302. In particular, the lugs 112a, 112b are aligned with the side openings 306a, 306b and the spigot 108 is aligned with the central opening 304. This permits the lugs 112a, 112b to move to the underside of the structure 300. The fixing 100 is then rotated (e.g. 45 degrees) to move the lugs 112a, 112b into alignment with the orientation of the recesses 308a, 308b. The lugs 112a, 112b will then secure the fixing 100 to the structure 300 and thereby also retainingly connect the spare wheel 200 to the structure 300.

Referring in particular to FIGS. 5A-5B to 6A-6C, the fixing 100 also includes a first resilient articulated arm 114a and a second resilient articulated arm 114b. The resilient articulated arms 114a, 114b extend from the shoulder 110 towards respective lugs 112a, 112b (i.e. in a direction parallel to the longitudinal axis of the shaft 106). Preferably, the resilient articulated arms 114a, 114b are axially aligned with the lugs 112a, 112b. However, it is understood by the person skilled in the art that the resilient articulated arms 114a, 114b may also be arranged circumferentially offset from the orientation of the lugs 112a, 112b. During use, the resilient articulated arms 114a, 114b are configured to biasingly engage with the structure 300 so as to urge the fixing 100 away from the structure 300 (i.e. towards the spare wheel 200) and pulling (i.e. bias) the lugs 112a, 112b into respective recesses 308a, 308b. This biasing action acts to help retain the lugs 112a, 112b in the recesses 308a, 308b and prevent rotation of the fixing 100, thereby securing the spare wheel 200 to the structure 300.

As is illustrated in FIG. 6A, each resilient articulated arm 114a, 114b has a first portion 116a, 116b that extends directly from the shoulder 110. The first portion 116a, 116b is connected to the shoulder 110 at a first articulation 118a, 118b. The first articulation 118a, 118b is resilient and permits the first portion 116a, 116b to resiliently bend relative to the shoulder 110. Preferably, the first portion 116a, 116b extends from the shoulder 110 at a predetermined angle of approximately 45 degrees with respect to a planar surface of the shoulder 110.

Further, each one of the resilient articulated arms 114a, 114b has a second portion 120a, 120b joined to a respective distal end of the first portion 116a, 116b via a second articulation 122a, 122b. Preferably, when in a non-deformed state (i.e. relaxed), the second portion 120a, 120b extends at an angle of approximately 90 degrees with respect to the orientation of the first portion 116a, 116b in a direction towards respective lugs 112a, 112b (i.e. towards a centre plane of the fixing 100). The second articulation 122a, 122b permits the second portion 120a, 120b to resiliently bend relative to the first portion 116a, 116b.

In addition, each one of the resilient articulated arm 114a, 114b comprises a contact portion 124a, 124b formed at the distal end of the second portion 120a, 120b. The contact portion 124a, 124b extends from the second portion 120a, 120b in a direction that is approximately transverse to the direction of the longitudinal axis of the coaxial shaft 106 and spigot 108. The contact portion 124a, 124b is configured to engage with the structure 300, as described hereinafter, so as to facilitate sliding movement between the resilient articulated arm 114a, 114b and the structure 300.

Each one of the resilient articulated arm 114a, 114b forms a resilient biasing member (such as a spring member). When exerting pressure on the contact portion 124a, 124b (or on the second portion 120a, 120b) the resilient articulated arms 114a, 114b will bend at respective first and second articulations 118a,b, 122a,b and fold on itself. The first and second articulations 118a,b, 122a,b are resilient and the resilient articulated arms 114a, 114b exert an opposing force against such bending.

Referring now to FIG. 6C in particular, during use, when the connector portion 102 extends through the connection feature 302 in the structure 300, the resilient articulated arms 114a, 114b (in particular the contact portions 124a, 124b and/or second portions 120a, 120b) contact the structure 300 proximate to the connection feature 302. The resilient articulated arms 114a, 114b are thereby forced to bend about its articulations 118, 122. When the fixing 100 is rotated, the resilient articulated arms 114a, 114b act to urge the lugs 112a, 112b against the underside of the structure 300. In particular, the resilient articulated arms 114a, 114b act to urge the lugs 112a, 112b into the recesses 308a, 308b (see FIG. 7). The resilient articulated arms 114a, 114b thereby act to retain the lugs 112a, 112b within the recesses 308a, 308b and help to secure the spare wheel 200 to the structure 300.

As shown most clearly in FIG. 5B, the resilient articulated arms 114a, 114b have opposite orientations (i.e. the bending orientation with respect to a central plane of fixing 100) so that the second portions 120a, 120b are both angled to facilitate bending/sliding as the fixing 100 is rotated (e.g. clockwise). Even more particularly, the resilient articulated arms 114a, 114b are angled so that the second portions 120a, 120b form an acute angle with the structure 300 towards, for example, the clockwise direction. In this way, as the fixing 100 is rotated, the angle of the second portions 120a, 120b help to prevent jamming and to allow the resilient articulated arms 114a, 114b to bend.

Referring now back to FIG. 7, the connection feature 302 of the structure 300 comprises raised areas 310a, 310b arranged either side of the opening central 304. These raised features 310a, 310b may be formed by, and correspond to, the recesses 308a, 308b formed on the opposite surface of the structure 300. Thus, when the fixing 100 is rotated so that the lugs 112a, 112b are received in the recesses 308a, 308b, the resilient articulated arms 114a, 114b are engaged with these raised areas 310a, 310b ensuring that the resilient articulated arms 114a, 114b remain at least partially bent once the fixing 100 is coupled to the structure 300 to maintain the biasing action. Preferably, the structure 300 has respective slopes 312a, 312b leading to each raised portion 310a, 310b. The slopes 312a, 312b facilitate the bending action of the resilient articulated arm 114a, 114b when moving to the raised area 310a, 310b.

Preferably, the resilient articulated arms 114a, 114b are integrally moulded with the shaft 106, the spigot 108 and the lugs 112a, 112b. That is, the shaft 106, connector portion 102 and resilient articulated arms 114a, 114b are moulded as a single component, for example, via injection moulding. Preferably, the shaft 106, connector 102 and resilient articulated arms 114a, 114b are made from a polymer material, for example, polyoxymethylene (POM). The resilient first and second articulations 118a,b/122a,b of the resilient articulated arms 114a, 114b may be formed by configuring the geometry and thickness of the material, as is known in the art.

In some examples, the cap member 104 is also integrally moulded with the shaft 106, connector portion 102 and resilient articulated arms 114a, 114b. In other examples, the cap member 104 may be separate and attached to the shaft 106 subsequently. In such examples the cap member 104 may be made from a different material, for example, a metal, such as steel or stainless steel. In examples where the cap member 104 is separate to the shaft 106 (and attachable by a threaded connection as previously described) and the fixing 100 (i.e. shaft 106) can be attached to the structure 300, the spare wheel 200 may be positioned over the shaft 106 so that the shaft 106 extends through the hole 202 in the spare wheel 200, to then screw the cap member 104 onto the shaft 106 to secure the spare wheel 200. The partial threads allow the cap member 104 to move axially along the shaft 106 without rotation until the cap member 104 abuts the spare wheel 200, at which point partial rotation of the cap member 104 engages the threads to secure the cap member 104 to the shaft 106.

In various examples, the fixing 100 may comprise only a single clamping lug 112 and/or only a single resilient articulated arm 114. In other examples, the fixing 100 may comprise more than two clamping lugs 112, for example, three or four clamping lugs 112. The profile of the opening that forms the connection feature 302 in the structure 300 may be adapted accordingly. In other examples, the fixing 100 may comprise more than two resilient articulated arms 114, for example three or four resilient articulated arms 114.

Reference number list:
100 fixing
102 Connector portion
104 Cap member
106 shaft
108 spigot
110 shoulder
112a,b lugs
114a,b Articulated arms
116a,b First portion
118a,b First articulation
120a,b Second portion
122a,b Second articulation
124a,b Contact portion
200 Spare wheel
202 Central bore
300 Vehicle structure
302 Connection feature
304 Central opening
306a,b Side openings
308a,b recesses
310a,b Raised areas
312a,b slopes

What is claimed is:
1. A fixing for securing a spare wheel to a structure, the fixing comprising:
a shaft comprising a shoulder;

a connector disposed at a first end of the shaft and having a lug arranged such that rotation of the fixing relative to the structure moves the lug into a recess of the structure to secure the fixing to the structure; and wherein the connector further comprises a resilient articulated arm arranged to act between the fixing and the structure to urge the lug into the recess when the fixing is connected to the structure;

wherein the resilient articulated arm is an integrally moulded part of the fixing that is integrally moulded with and extends from the shoulder in an axial direction of the shaft toward the lug;

wherein the fixing includes a cap member, the shaft extends from the cap member to position the shoulder at the first end of the shaft.

2. The fixing of claim 1, wherein the resilient articulated arm comprises a first articulation at the join between the resilient articulated arm and the shoulder, the first articulation being resiliently bendable.

3. The fixing of claim 2, wherein an end of the resilient articulated arm opposite to the first articulation is a free end, and wherein the resilient articulated arm further comprises a second articulation disposed between the first articulation and the free end.

4. The fixing of claim 3, wherein the second articulation bends in an opposite direction to the first articulation.

5. The fixing of claim 1, wherein shaft is threaded and the cap member is threadedly engaged on the shaft.

6. The fixing of claim 1, wherein the shoulder is an integral part of the shaft having a fixed position along the shaft.

7. A fixing system for securing a spare wheel to a vehicle, the fixing system comprising:
a structure comprising a recess; and
the fixing of claim 1, the lug of the fixing being configured to engage the recess of the structure to connect the fixing to the structure.

8. A fixing for securing a spare wheel to a structure, the fixing comprising:
a shaft comprising a shoulder;
a connector disposed at a first end of the shaft and having a lug arranged such that rotation of the fixing relative to the structure moves the lug into a recess of the structure to secure the fixing to the structure; and
wherein the connector further comprises a resilient articulated arm arranged to act between the fixing and the structure to urge the lug into the recess when the fixing is connected to the structure;
wherein the resilient articulated arm is an integrally moulded part of the fixing that is integrally moulded with and extends from the shoulder in an axial direction of the shaft toward the lug;
wherein the fixing includes a cap member, the shaft extends from the cap member such that the shoulder is spaced away from the cap member toward the first end of the shaft.

9. A fixing system for securing a spare wheel to a vehicle, the fixing system comprising:
a structure comprising a recess; and
the fixing of claim 8, the lug of the fixing being configured to engage the recess of the structure to connect the fixing to the structure.

* * * * *